United States Patent [19]
Brandt et al.

[11] Patent Number: 5,997,960
[45] Date of Patent: Dec. 7, 1999

[54] GLASS CONTAINER COATING PROCESS

[75] Inventors: Thomas L. Brandt, Windsor; Daniel N. Willkens, Elmira, both of N.Y.

[73] Assignee: Brandt Technologies, Inc., Windsor, N.Y.

[21] Appl. No.: 08/486,502

[22] Filed: Jun. 7, 1995

Related U.S. Application Data

[62] Division of application No. 08/105,975, Aug. 12, 1993, abandoned, which is a continuation of application No. 07/660,990, Feb. 27, 1991, abandoned, which is a continuation of application No. 07/432,441, Nov. 6, 1989, abandoned, which is a continuation-in-part of application No. 07/267,877, Nov. 7, 1988, abandoned.

[51] Int. Cl.$^6$ .................................. C08J 7/18; B05D 1/36
[52] U.S. Cl. ................... 427/514; 427/518; 427/389.7; 427/407.2; 65/117; 65/60.3; 215/DIG. 6; 428/34.7
[58] Field of Search .................................. 428/34.6, 34.7, 428/336, 339, 441; 215/DIG. 6; 427/389.7, 518, 514, 407.2; 65/117, 60.3

[56] References Cited

U.S. PATENT DOCUMENTS

| | | | |
|---|---|---|---|
| 3,859,117 | 1/1975 | Erchak et al. | 427/185 |
| 3,889,030 | 6/1975 | Arrandale | 428/34.7 |
| 4,075,363 | 2/1978 | Shank, Jr. | 428/34.7 |
| 4,224,365 | 9/1980 | Ali-Zaidi | 428/34.7 |
| 4,264,658 | 4/1981 | Tobias et al. | 428/34.7 |
| 4,731,289 | 3/1988 | Coleman | 428/334 |
| 4,940,613 | 7/1990 | Golino | 428/34.7 |
| 5,182,148 | 1/1993 | Kapp et al. | 428/34.6 |
| 5,458,714 | 10/1997 | Brandt et al. | 156/237 |

*Primary Examiner*—Rena L. Dye
*Attorney, Agent, or Firm*—Sughrue, Mion, Zinn, Macpeak & Seas, PLLC

[57] ABSTRACT

A coating for a clear (flint) glass container that can be readily formulated to provide a wide range of colors and finishes and protect the contents from natural and ultraviolet light. When applied and cured the coating will provide increased abrasion and impact resistance and process through all container filling operations.

16 Claims, 1 Drawing Sheet

GLASS CONTAINER COATING PROCESS

REFERENCE TO RELATED APPLICATIONS

This application is a divisional of application Ser. No. 08/105,975, filed Aug. 12, 1993, now abandoned, which was a continuation of application Ser. No. 07/660,990 filed Feb. 27, 1991, now abandoned, which was a continuation of application Ser. No. 07/432,441, filed Nov. 6, 1989, now abandoned, which was a continuation-in-part of application Ser. No. 07/267,877, filed Nov. 7, 1988, and now abandoned. This application is related to application Ser. Nos. 07/431,967, 07/431,968 and 07/432,442, all filed Nov. 6, 1989, all now abandoned, the disclosures of which are incorporated by reference herein.

BACKGROUND OF THE INVENTION

The present invention is directed to a technique for coating glass containers, and more particularly to a technique for applying color coatings that singularly or together may be colored, block ultra-violet light, and offer a range of surface textures.

The glass container industry limits itself to three primary colors for containers: clear glass (commonly called flint glass), amber and green. The green and amber are melted in several hues for both product differentiation and protection of the contents from the adverse effects of transmitted visual light as well as the ultra-violet component of natural and artificial light. Significant cost resulting from lost production when a glass melting unit changes from one color to another is experienced throughout the industry as well as the cost to carry inventory of containers made of a specific color during a run of a few weeks that will satisfy many months of need. There is also an ongoing cost of glass raw materials necessary for coloring, as well as the additional cost of storage silos and batch material weighing apparatus. In addition, extra fuel is required to melt colored glass batch. Also, the melting furnace life is reduced by the corrosive action of colored glass batches.

Recycling of glass containers has become a very popular and cost effective way to deal with empty glass container disposal. One problem of the existing system is the need to segregate the various colors of glass so as not to contaminate the different glass melts. This segregation requires three separate systems from the empty container receiving station throughout all of the handling up to and including the charging of the melting unit with the proper color glass. Introduction of expensive machinery is required to separate containers collected without segregation.

It is common practice in the glass industry to treat the outer surface of the containers with materials to counteract the effects of high glass-to-glass friction experienced on freshly manufactured glass products. Glass containers are conveyed with a great deal of glass-to-glass contact and at times considerable line pressure. Without treatment there is considerable visible scratching which may result in breakage. It is common to surface treat at two (2) locations in the operation. Immediately after forming and before lehring, the containers pass through a vapor which leaves a tin oxide film bonded to the surface. After lehring, the containers are sprayed with a dilute water solution of a material which, after evaporation of the water, leaves a film to provide surface lubricity. Of the two treatments, the tin oxide film is most costly, both for materials and system maintenance. The lubricity of the second film, though needed to prevent surface damage, may cause problems in subsequent labeling of the container.

There is an ongoing program in the container industry to reduce the weight of the container by reducing wall thickness, but still maintain acceptable product strength for both the internal pressures of carbonated beverages and the impact strength to survive handling damage in the filling operations, in the market place and by the consumer. The benefits of reduced weight are economic: lower glass melting fuel and material costs, higher container manufacturing speeds (lower cost) and reduced product shipping costs.

SUMMARY OF THE INVENTION

It is an object of the present invention, with certain variations, to overcome the above described glass industry problems and limitations.

More particularly, it is an object of this invention to provide a technique for coloring glass containers which is economic, environmentally sound and offers product protection not heretofore available.

It is a further object of this invention to provide a method for applying the materials to glass containers in line with the container manufacturing process, i.e., 500 containers per minute.

It is a further object to provide a color coated glass container with improved impact resistance and abrasion resistance.

It is a still further object of the invention to eliminate the need for a tin oxide coating.

Yet another object of this invention is to foster continued further reduction in container weight.

These and other objects and advantages of the invention are achieved by coating the glass containers with a material, preferably heat-curable or UV-curable acrylic, which provides impact resistance and durability, such that it is no longer necessary to provide the tin oxide film prior to container lehring. The coating material is selected to have a color corresponding to the desired container color, and/or can be selected to have a composition which will block certain wavelengths of light which are considered harmful to the contents of the bottle. The coating material also provides sufficient impact and abrasion resistance to permit the tin oxide film to be dispensed with, with merely a token amount of the lubricating film being applied after annealing. This lubricating film is one which is compatible with the coating, such as ammonium stearate. The lubricating film is sufficient to enable damage-free conveying from the lehr, through the inspection stations and into the color coat machine staging area.

It has been demonstrated that a container coated with a nominal 0.6 mil of the coating will survive a 30–40% increase in fracture impact over an uncoated container.

BRIEF DESCRIPTION OF THE DRAWINGS

The invention will be more clearly understood from the following description in conjunction with the accompanying drawing, which illustrates a bottle processing system for practicing the present invention.

DETAILED DESCRIPTION OF THE INVENTION

Figure 1:
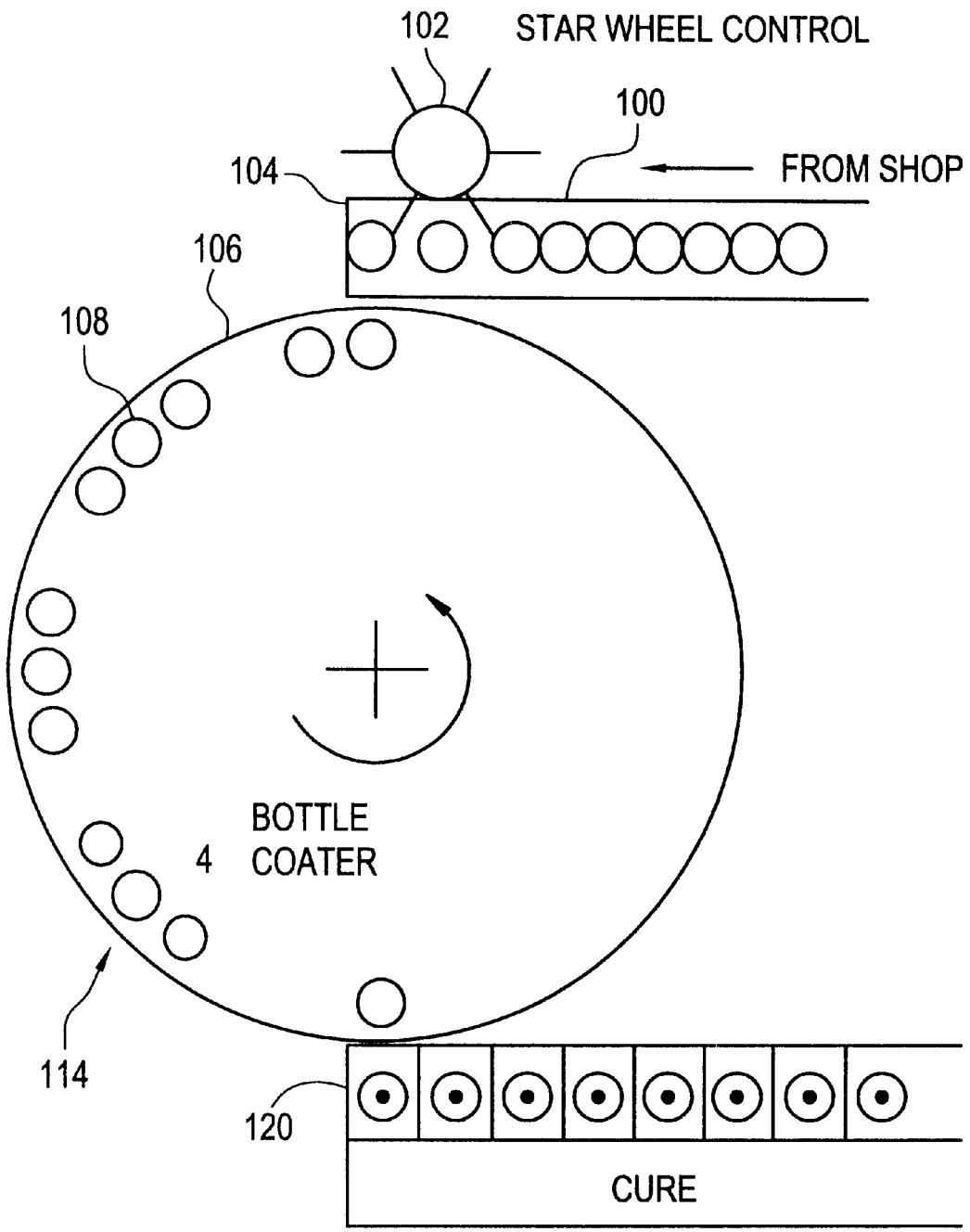

The present invention resides in applying to a clear (i.e., transparent and colorless) glass container a coating which may have a number of properties. There are a great number of properties which may be considered significant in any given case, but the properties discussed herein are color, light blocking for protection of the container contents from irradiation, abrasion resistance and impact resistance. The coating material is preferably a urethane coating, with appropriate additives as will be described below.

The first significant property of the coating material is the color. As described above, it is sometimes desirable to color the bottle, e.g., to amber or green, and this has heretofore been achieved by specific formulation of the glass batch introduced into the melters. Through the use of suitable additives, an acrylic coating (e.g., urethane), either heat-curable or UV-curable, could be made to provide the desired coloring of the container. The coloring technique would provide any color desired to suit the particular product, from light tints to fully opaque colors. The particular additives to be used for this purpose would depend on the colors desired, with a number of suitable organic dyes being well-known to those of skill in the art.

By coloring the glass after melting, many benefits are possible. To change from one color glass to another it is now necessary to completely drain a melting unit, flush and refill with the new color. In other cases, it may be possible to change by adding colored batch to clear, but even this results in a period of unusable glass until the output is uniformly colored. In any case, there is lost production time, usually a week, or more. According to the present invention, this lost time would be eliminated since only the clear glass would be required. The availability of any colored glass on demand would be of great interest to the container users. A major savings in batch material required for coloring glass would also be obtained.

Because the coating would burn off completely in the melting unit at the high furnace temperatures, the recycling of glass containers would be greatly facilitated. The present need to segregate glass containers by colors would be eliminated if all containers were clear glass and colored after manufacture. This would be of particular benefit to the collecting stations and recycling facilities responsible for the glass recycling programs.

The cured color coat is formulated to withstand the wash and pasteurization processes associated with non-returnable containers, and with chemical modifications to the color coat, returnable containers will be able to survive the alkali wash required prior to refilling. Nor will the color coat be adversely affected by water, alcohol or organic materials used in the filling operations.

The color coatings on adjacent containers will not abrade each other during the filling and packaging operations associated with transport, store display and consumer purchasing, and the color coat will also be chemically and physically stable.

It is known that it is necessary to protect some container contents, e.g., beer, from adverse effects in flavor (known as "sunstruck taste" in the brewing industry) due to prolonged exposure to natural and artificial light. This protection may in part be offered by amber glass, commonly used as a beer container, although neither green glass or clear (flint) glass offer protection. Further, even the protection afforded by amber glass decreases as the bottle becomes thinner. According to the present invention, suitable light blocking agents can be added to the topcoat to protect the container contents. By coating the outside surface uniformly, complete protection is achieved irrespective of container wall thickness.

A preferred technique for providing irradiation protection for the container contents is to determine, e.g., via spectrographic analysis, which wavelengths of light are absorbed by the container contents, and to then include additives in the topcoat which will block light in these regions. Again, the additives to be used would be known to those of skill in the art after determining the wavelengths of light to be blocked. The damaging ultra-violet component may be largely blocked by a clear additive, either to a clear or colored coating.

It has been demonstrated by this invention, that protection can be secured by the addition of various selected colorants and UV blocking agents to the coating material.

Variations in color coating texture and appearance may also be desirable. It has been demonstrated that with changes in coating composition the surface may be altered from gloss finish, to matte, to frosted. This is done without sacrificing physical properties.

In addition to providing desired container coloring and content irradiation protection, a further object of the invention to eliminate the cost of tin oxide coating. Because the acrylic coating of this invention provides impact resistance and durability, it is no longer necessary to provide the tin oxide film prior to container lehring or to even apply the present lubricant after annealing, although a token amount of a lubricating film may be applied after annealing. This lubricating film is sufficient to enable damage-free conveying from the lehr, through the inspection stations and into the color coat machine staging area. It should be a lubricating film compatible with the coating, such as ammonium stearate. Alternatively, it could be a film which may be easily burned off prior to the coating process, although in the preferred embodiment the ammonium stearate is compatible with the coating material and allows the bonding of the coating to the glass so that burning off of residual lubricant may not be necessary. For some container applications, however, it may be desirable to remove the stearate coating prior to coating.

As described above, it is yet another object of this invention to foster continued further reduction in container weight. It has been demonstrated that a container coated with a nominal 0.6 mil of the coating will survive a 30–40% increase in fracture impact over an uncoated container. In addition, the light blockage is no longer affected by the thickness of the glass, so that glass thickness is only limited by strength considerations.

It is also well known that considerable glass surface damage occurs throughout the container handling cycle including bulk and case packing at the container manufacturer. At the container filling operations, the handling surface damage is severe also. Because the coating provides a much greater degree of surface protection, container failure from surface damage would be greatly reduced. The applied layer of coating is complete over the entire surface without voids, or discontinuities. Further reductions in wall thickness without compromising container strength are therefore possible. These reductions have value in increasing container manufacturing speeds, reducing fuel usage and material costs as well as reducing transportation costs.

It may also be advantageous to use a coupling agent to promote adhesion of the color coat material to the container surface to meet certain container processing and use requirements, specifically, but not limited to the typical beer industry pasteurization process. While the coupling agent can be mixed with the color coat before application, it may be desirable to apply the coupling agent to the container surface before the color coat is applied for economic reasons as well as technical reasons.

It has been demonstrated that all three materials, i.e., the ultraviolet block, colorant, and coupling agent can be applied together in one solution and at one spray operation.

To receive the coating, the containers are conveyed into a multi-station spray system which has been designed to address the needs of uniform coverage of the container and recovery of the overspray.

In the event the materials are sprayed, it is desirable to prevent any material from contacting the finish of the container. This is the area including the opening, top seal surface, thread or closure cover area and protuberance immediately below. This could be accomplished using a container gripper device designed to completely cover the area described above, e.g., with a split housing which, when closed, dovetails to form a barrier to the spray material. Dipping and flow coating are other processes that may be used to apply the coating.

The gripper devices are attached to a conveyor network whose design allows for spacing of the glass containers to optimize the coating and curing of the coating materials. The grippers should also be designed for rotating the container at the spraying and curing positions to insure uniform coating and processing.

Rather than spraying, the application of the coating solution could be accomplished by belt or roller coating as described in copending application A-5477-1 identified above. Alternative methods of applying the topcoat include, but are not limited to, the use of a roller shaped to conform to the contour of the container, a belt flexible enough to conform to the container contour, or flowing the coating over the container while it is slowly rotated. Dipping may also be advantageous. Each option has its own merits and must be weighed against economics, quality and production rates.

The containers are then conveyed to a circulating hot air cure chamber designed to provide the necessary exposure to hot air to completely cure the topcoat. It has been demonstrated that air moving at 1500 feet per minute and at a temperature of 550° F. will insure a complete cure in 1.5 minutes.

Immediately following cure of the topcoat, the container can be packaged for shipment and subsequent wash, filling and pasteurization, if required, by the various food and beverage packaging operations.

The single FIGURE herein illustrates one example of a system for applying the coating of this invention. The coating with ammonium stearate would be performed before the bottles are received at the upper right of the FIGURE along a conveyor 100. The bottles would then be transferred to a loading station 104 one at a time by a star wheel control device 102. The bottles are then moved downwardly onto an indexing table 106 by means of a suitable placement device. The indexing table 106 will include container holders, e.g., suction holders or the like, and there may be supports at the neck of each container to absorb pressure during the container transfer.

After loading three bottles onto the indexing table 106, the indexing table is then rotated counterclockwise from the loading station to a container orienting station generally designated at reference character 108. If desired or necessary for the particular type of container being used, the container may here be rotated to a particular orientation, although this will be unnecessary in many container systems. The rotating of the container would preferably be performed by rotation of individual container holder suction cups on the indexing table 106 until the correct position is detected, e.g., by suitable photo-electric means, at which point the holders would be locked in their correct positions.

If it is desirable to burn off residual lubricant, this can be done at station 108, in addition to proper orienting of the bottles, preferably by an oxidizing flame but alternatively by other means such as corona treatment.

After proper orienting of the bottles and optional removal of lubricant, the indexing table 106 is further rotated to bring the bottles to the coating station 114 where the coating of this invention is applied. As described in related application Ser. No. 432,442, now abandoned, the coating thickness may be approximately 0.5 mil over the label (if a label has been applied, e.g., between stations 108 and 114) and 1.0 mil over the remainder of the bottle. Also, as indicated above herein, a 0.6 mil coating over the entire bottle may be sufficient.

The indexing table 106 is then further rotated to bring the coated bottles to an unloading station where each container is off-loaded onto a container conveyor. There are a number of ways in which the bottles could be removed. All bottles could be removed from the indexing table 106 to a single conveyor 120, taking care to ensure that the coatings are not disturbed. It may, be necessary, with suitable care taken, to use an air knife. It may, however, be necessary to move the bottles by clamping them at their "finish" and carrying them onto the conveyor 120 in a known manner.

It is also to be remembered that the bottles are held in groups of three on the indexing table 106. In the interest of speed, it would be possible to arrange three separate conveyors 120 each for receiving one of the three bottles in each group from the indexing table 106.

Once on the conveyor 120, the coating on the bottles is cured in a suitable manner, e.g., by heat in the case of heat-curable coating or by U-V energy in the case of UV-curable coating. After the curing process, the conveyor 120 carries the bottles to a further container processing stage, e.g., labelling, inspection, packing and/or filling.

A topcoating material as described herein will impart a desired color to a bottle, will increase abrasion and impact resistance of the glass container, will be waterproof and unaffected by the contents of any food or beverage, will be glossy and will not be abraded by like material, and will cover flaws and irregularities on the surface of glass containers such as to render them nearly invisible.

It has been demonstrated that the heat-curable color coating material can be cured quickly with hot convective air, easily achieved with commercial equipment. It is necessary to achieve a glass substrate temperature of 300° F. to achieve all of the desired properties of the color coat. Other curing processes are available.

It will be appreciated that further modifications could be made to the embodiment disclosed above while still obtaining many of these advantages and without departing from the spirit and scope of the invention as described in the appended claims.

What is claimed is:

1. A method of forming a coated container, comprising the steps of:

forming a container of glass, said glass having an inside surface directed toward an interior of said container and an outer surface directed toward an exterior of said container;

annealing said glass container;

applying a first coating material to said container at a first location in a container fabrication line subsequent to said annealing step;

conveying said container to a second location with said first coating material providing surface lubricity; and applying an acrylic coating layer which is compatible with said first coating material over said glass on said outer surface of said container in liquid form while at least some of said first coating material remains on said outer surface; and curing said acrylic coating layer, said acrylic coating layer having a cured thickness of no greater than about 0.0006 inch.

2. A method according to claim 1, wherein said glass is substantially clear.

3. A method according to claim 1, wherein said coating layer is clear.

4. A method according to claim 1, wherein said coating layer is colored.

5. A method according to claim 1, wherein said coating layer is heat-curable.

6. A method according to claim 1, wherein said coating layer is UV-curable.

7. A method according to claim 4, wherein said coating layer contains a light blocking agent for blocking at least one predetermined wavelength of light in addition to any light blocked by the color of said coating.

8. A method according to claim 7, wherein said one predetermined wavelength is ultraviolet.

9. A method according to claim 7, wherein said glass is substantially clear.

10. A method according to claim 7, wherein said coating layer is heat-curable.

11. A method according to claim 7, wherein said coating layer is UV-curable.

12. A method according to claim 1, wherein said container is a container for holding a liquid under pressure.

13. A method according to claim 7, wherein said one predetermined wavelength is outside of the ultraviolet region.

14. A method according to claim 1, wherein said first coating material overlies said glass in direct contact with said glass without intermediate layers.

15. A method according to claim 1, wherein said first coating material is ammonium stearate.

16. A method according to claim 5, wherein said step of applying said acrylic coating includes the step of curing said coating in no more than approximately 1.5 minutes by application of heat.

* * * * *